UNITED STATES PATENT OFFICE.

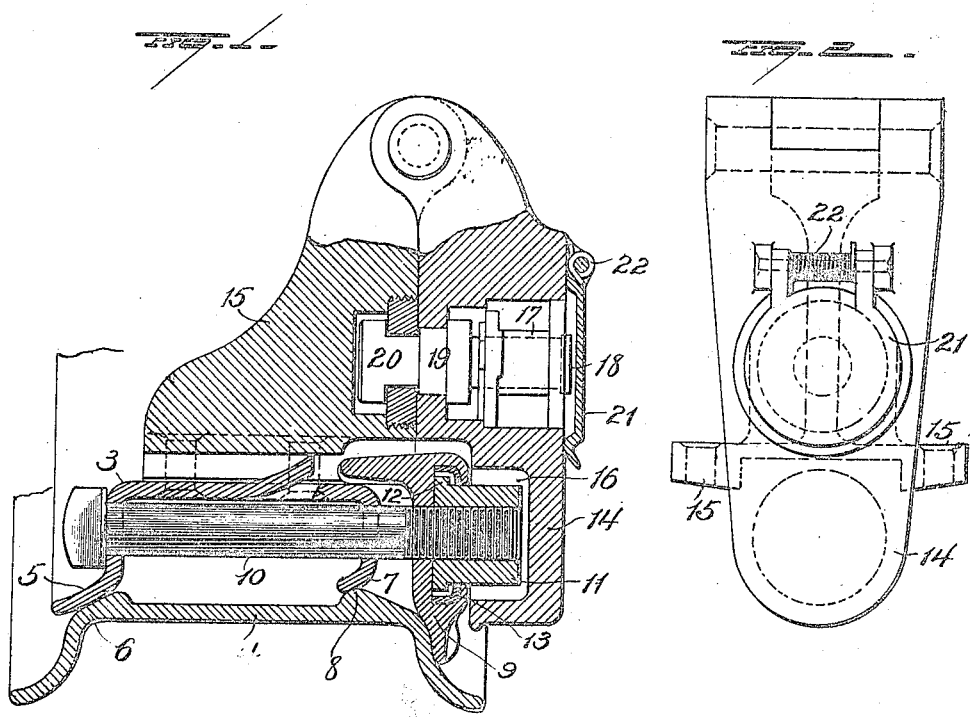

PETER F. AUGENBRAUN, OF STAMFORD, CONNECTICUT, ASSIGNOR TO THE YALE & TOWNE MANUFACTURING COMPANY, OF STAMFORD, CONNECTICUT.

AUTOMOBILE TIRE LOCK.

1,412,646.   Specification of Letters Patent.   Patented Apr. 11, 1922.

Application filed March 13, 1920. Serial No. 365,520.

*To all whom it may concern:*

Be it known that I, PETER F. AUGEN-BRAUN, a citizen of the United States, and a resident of Stamford, in the county of Fairfield and State of Connecticut, have invented certain new and useful Improvements in Automobile Tire Locks; and I do hereby declare the following to be a full, clear, and exact description of the invention, such as will enable others skilled in the art to which it appertains to make and use the same.

My invention relates to an improvement in automobile tire locks, the object being to provide a simple and efficient device that can be applied to any tire carrier or automobile wheel for locking the demountable rim or tire to the spare rim carrier or to a wheel; and it consists in the parts and combination of parts as will be more fully explained and pointed out in the claims.

In the accompanying drawings, Figure 1 is a view in transverse section of my improvement applied to a rim carrier and Figure 2 is a view in end elevation of the same.

While my improvement is designed more particularly for locking a spare rim or tire to a tire carrier, it is equally well adapted for locking the rim or tire to an automobile wheel for preventing the theft or unauthorized removal of said rim, hence while I will hereinafter refer to the part to which the lock is applied as the tire carrier it is to be understood that such term includes a wheel.

3 represents the rim carrier which is circular in form and of a size to receive the rim 4, the tire not being shown on the latter. One edge 5 of the carrier is bent to engage one side edge of the rim 4, and the other edge of the carrier is constructed to permit the rim to be passed over onto the carrier and be supported thereon by the bent edge 6 of the carrier which overlaps and rests against the bent edge 5 of the rim, and by the bent edge 7 of the carrier engaging the rib 8 on the inner face of the rim, the latter being locked to the carrier by the clamp 9 carried by the carrier and which overlap the other edge of the rim as shown in Figure 1.

The lock herein shown and described may be applied to all the securing clamps 9 on the carrier, or to only two of them, hence I would have it understood that I do not confine myself to the lock applied to each clamp on the carrier. The clamp securing bolts 10 pass through the side flange of the carrier 3 and through the clamp 9 and is provided with a head at one end and threaded at the other or outer end for the nut 11.

I have shown the nut having a peripheral flange 12 housed within a recess 13 in the clamp 9, so that while the nut is free to turn in the clamp it is held against removal from the latter, but it is clearly evident that the nut may be separate and independent of the clamp and bear against the outer face of the latter. The nut projects from the outer face of the clamp and is housed and concealed by the cover 14 which is hinged at one end to the bracket 15, riveted or otherwise permanently fastened to the carrier 3. This cover is of sufficient length to overhang the clamp 9 and prevents its outward displacement or removal, and it is provided adjacent its free edge on its inner face with a recess 16 to receive the nut 11 on the clamp securing bolt 10 and form a housing for the same. The recess 16 is of sufficient depth to receive the projecting end of the bolt 10 and the nut thereon, thus permitting the cover 14 to rest close to or in contact with the clamp, so that the nut will be inaccessible when the cover is locked. With such construction it will be seen that if the bolt 10 should be removed from the carrier the cover housing and enclosing the nut carried by the clamp would prevent the removal of the clamp and consequently prevent the removal of the rim 4.

The cover 14 is provided with a key actuated lock 17, preferably of the pin tumbler cylinder type, the movable member 18 of which operates a revolving bolt 19 having a T-shaped head 20. The bracket 15 is recessed to receive the head of the bolt and is provided with a slot which when the bolt is in its unlocked position alines with said T-head and permits the cover 14 to be swung outwardly and thus expose the nut. By inserting the proper key in lock 17 and turning the same, the T-headed bolt will be turned to a position at right angles to the length of the slot in the bracket, as shown in Figure 1 and lock the cover 14 in place.

The lock 17 is normally covered and protected from the weather by the swinging cap 21 which is held in its normal position by the spring 22.

By turning bolt 20 to its unlocking position and lifting the cover the nut and clamp can be removed from the bolt, thus permitting of the removal of the tire from the carrier.

It is evident that many slight changes might be made in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. In an automobile tire lock, the combination of a carrier, a rim locking clamp, a bolt and nut for securing the clamp to the carrier, a cover carried by the carrier and overlapping the clamp and housing the nut and a key lock mechanism for locking the cover over the nut.

2. In an automobile tire lock, the combination of a carrier, a rim locking clamp, a bolt and nut for securing the clamp to the carrier, a bracket secured to the carrier, a cover carried by the bracket, overlapping the clamp and recessed to receive and house the nut on the clamp securing bolt, and a key actuated lock for locking the cover in position over the nut.

3. In an automobile tire lock, the combination of a carrier, a rim locking clamp, a bolt and nut for securing the clamp to the carrier, a bracket secured to the carrier, a hinged cover carried by the bracket and overlapping the clamp, and a key actuated lock for locking the cover in position over the outer face of the clamp.

4. In an automobile tire lock, the combination of a carrier, a rim locking clamp, a bolt and nut for securing the clamp to the carrier, a bracket secured to the carrier, a cover hinged to the bracket and recessed to receive and house the outer end of the bolt and the nut on the latter, and key lock for locking the cover to the bracket.

5. In an automobile tire lock, the combination of a carrier, a rim locking clamp, a bolt and nut for securing the clamp to the carrier, a bracket secured to the carrier, a cover hinged to the bracket and adapted to house the nut and a key lock carried by the hinged cover and having a bolt to engage the bracket for locking the cover against opening movement.

6. In an automobile tire lock, the combination of a carrier, a rim locking clamp, a nut carried by and mounted to rotate in the clamp, a bolt passing through the clamp and a nut for locking the former to the carrier, a bracket secured to the carrier, a cover hinged to the bracket and adapted to house the clamp holding nut, and a key lock mechanism for locking the cover against an opening movement.

7. In an automobile tire lock, the combination of a carrier, a rim locking clamp, a bolt and nut for securing the clamp to the carrier, a member secured to the carrier, a cover hinged to the member and overlapping the clamp, and a lock for locking the cover in position over the outer face of the clamp.

8. In an automobile tire lock, the combination of a carrier, a tire locking clamp, a bolt and nut for securing the clamp to the carrier, a member secured to the carrier, a cover hinged to the member and recessed to receive and house the outer end of the bolt and the nut on the latter, and a lock for locking the cover to the member.

In testimony whereof, I have signed this specification in the presence of two subscribing witnesses.

PETER F. AUGENBRAUN.

Witnesses:
 JULIUS A. WEST,
 CHARLES A. BERRY.